United States Patent [19]

Lim et al.

[11] Patent Number: 5,418,718
[45] Date of Patent: May 23, 1995

[54] METHOD FOR PROVIDING LINGUISTIC FUNCTIONS OF ENGLISH TEXT IN A MIXED DOCUMENT OF SINGLE-BYTE CHARACTERS AND DOUBLE-BYTE CHARACTERS

[75] Inventors: Chan S. Lim, Potomac; Gregg A. Salsi, Germantown, both of Md.

[73] Assignee: International Business Machines Corporation, Armonk, N.Y.

[21] Appl. No.: 253,813

[22] Filed: Jun. 3, 1994

Related U.S. Application Data

[63] Continuation of Ser. No. 71,886, Jun. 7, 1993, abandoned.

[51] Int. Cl.⁶ .................................. G06F 15/209
[52] U.S. Cl. ..................... 364/419.16; 364/419.1; 364/419.11; 364/419.12; 364/419.02
[58] Field of Search ........... 364/419.02, 419.1, 419.11, 364/419.12, 419.13, 419.16, 419.14

[56] References Cited

U.S. PATENT DOCUMENTS

| | | | |
|---|---|---|---|
| 4,498,148 | 2/1985 | Glickman | 364/419.12 |
| 4,543,631 | 9/1985 | Kurosu et al. | 364/200 |
| 4,559,614 | 12/1985 | Peek et al. | 395/500 |
| 4,737,779 | 4/1988 | Somigli et al. | 340/745 |
| 4,745,561 | 5/1988 | Hirosawa et al. | 364/523 |
| 4,751,740 | 6/1988 | Wright | 382/1 |
| 4,755,955 | 7/1988 | Kimura et al. | 364/518 |
| 4,831,529 | 5/1989 | Miike et al. | 364/419.04 |
| 4,863,296 | 9/1989 | Yamakawa et al. | 400/63 |
| 4,868,913 | 9/1989 | Tse-Kai | 340/711 |
| 4,903,206 | 2/1990 | Itoh et al. | 364/419 |
| 4,933,880 | 6/1990 | Borgendale et al. | 364/523 |
| 4,949,287 | 8/1990 | Yamaguchi et al. | 364/523 |
| 4,954,979 | 9/1990 | Elbner et al. | 395/150 |
| 5,005,137 | 4/1991 | Ernst | 364/514 |
| 5,043,712 | 8/1991 | Kihara et al. | 340/735 |
| 5,079,701 | 1/1992 | Kuga et al. | 364/419 |
| 5,084,817 | 1/1992 | Kumano et al. | 364/419.04 |
| 5,084,820 | 1/1992 | Nagaya et al. | 364/419.14 |
| 5,091,878 | 2/1992 | Nagasawa et al. | 364/419.14 |
| 5,167,016 | 11/1992 | Bagley et al. | 395/144 |
| 5,251,273 | 10/1993 | Betts et al. | 382/57 |

OTHER PUBLICATIONS

IBM Manual, "DOS Bunsho (Language) Program II Operation Guide" (N:SH18-2131-2) (Partial Translation of p. 79).

Primary Examiner—Robert A. Weinhardt
Assistant Examiner—Gita D. Shingala
Attorney, Agent, or Firm—Edward H. Duffield; John E. Hoel

[57] ABSTRACT

In a single-byte character set English text mixed with a double-byte character set Japanese text, both an English spelling aid and a Japanese spelling aid can be provided and each respective spelling aid will be invoked depending upon whether the SBCS character set is indicated for English text or the DBCS character set is indicated for Japanese text. Still further, for a text which is mixed national languages of for example, English and German, the linguistic flag field can include additional information identifying the national language for a particular text string. Then if the linguistic flag field indicates that there is a misspelling for German, or a misspelling for English, then the corresponding text string can be highlighted on the display screen.

8 Claims, 11 Drawing Sheets

It is つずり necesary 必要 to check the speling.

FIG. 4D

It is つずり necessary 必要 to check the spelling.

METHOD FOR PROVIDING LINGUISTIC FUNCTIONS OF ENGLISH TEXT IN A MIXED DOCUMENT OF SINGLE-BYTE CHARACTERS AND DOUBLE-BYTE CHARACTERS

The application is a continuation of application Ser. 08/071,886, filed Jun. 7, 1993, now abandoned.

BACKGROUND OF THE INVENTION

1. Technical Field

The invention disclosed broadly relates to data processing systems and more particularly relates to an improved system and method for providing linguistic functions of English text in a mixed single-byte character set and double-byte character set document.

2. Background Art

Related copending patent application entitled "Style Component of a WYSIWYG Text Editor," by K. W. Borgendale, et al., Ser. No. 523,082 dated May 14, 1990, now U.S. Pat. No. 5,276,793, assigned to IBM and incorporated herein by reference.

Related copending patent application entitled "Method and System for Storing Multiple, Modifiable Yomi and Kanji Strings in a Structured Document," by Chan S. Lim, et al., Ser. No. 07/968,017 filed Oct. 29, 1992, assigned to IBM Corporation and incorporated herein by reference.

Current text editors allow spell checking for document text which is exclusively double-byte character sets and other current text editors allow spell checking for document text that are exclusive single-byte character sets, however there is no known spell checking or text editor system which allows spell checking in a mixed document of both single-byte and double-byte characters. This becomes important in modern mixed text documents where a misspelling in English occurs and yet the spell checker cannot process the mixed single-byte and double-byte character Kanji characters. In addition, it would be useful to have both English text single-byte character spell checkers and Japanese text double-byte character spell checkers capable of spell checking a single mixed text document. In addition, not only would it be appropriate to have spell checking facility applicable to a mixed text document, but other linguistic tools such as grammar checking would be usefully applied to mixed text documents.

OBJECTS OF THE INVENTION

It is therefore an object of the invention to provide an improved means for performing linguistic functions on English text in a mixed single-byte character and double-byte character text in a document.

It is still a further object of the invention to provide both English text linguistic functions and double character set linguistic functions in a mixed document.

SUMMARY OF THE INVENTION

These and other objects, features and advantages are accomplished by the invention. The method of the invention allows both single-byte character set (SBCS) and double-byte character set (DBCS) text strings. The invention stores the SBCS and DBCS text of the document in separate areas. Each area contains the following specific information about the text: a linguistic flag which indicates for example whether the corresponding text is correctly spelled, the actual text itself, the length and characters of the text, the horizontal starting position of the text, and the flag to indicate that the text is SBCS or DBCS text, and the value which points to the next area containing some text. The linguistic flag can indicate that the corresponding text string is correctly spelled. For example, if an English spell verification program is associated with the invention, such as that described in U.S. Pat. No. 4,498,148 to Glickman, either in real time while the characters are being entered at the keyboard, or afterward when all of the text has been entered, the spell verification program can check individual English text strings for correct spelling. If the string is correctly spelled, then a first value such as a binary zero is set in the linguistic flag field or alternately if it is misspelled, then a binary one can be set in the field. A document is then set up to use the different character sets either SBCS or DBCS, for specific sections of text and it may alternate back and forth between the character sets as many times as is necessary. The text of the document that uses the different character sets will be in separate areas and each area will contain its own text. The linguistic flag field for each text node can be used to initiate a highlighting of the corresponding text strings where there is a misspelled word in the string. Then, the user can select a spelling aid program associated with the invention, such as that described in the Glickman patent, to present to the user a set of candidate correctly spelled words, The user can then select the correctly spelled word which was originally intended, and the spelling aid will substitute the correctly spelled word for the highlighted word in the text. Then, in accordance with the invention, the flag bit in the linguistic field will be turned off. The invention can be applied to more than a single language for spell checking. For example, in a single-byte character set English text mixed with a double-byte character set Japanese text, both an English spelling aid and a Japanese spelling aid can be provided and each respective spelling aid will be invoked depending upon whether the SBCS character set is indicated for English text or the DBCS character set is indicated for Japanese text. Still further, for a text which is mixed national languages of for example, English and German, the linguistic flag field can include additional information identifying the national language for a particular text string. Then if the linguistic flag field indicates that there is a misspelling for German, or a misspelling for English, then the corresponding text string can be highlighted on the display screen.

DESCRIPTION OF THE FIGURES

These and other objects, features and advantages will be more fully appreciated with reference to the accompanying figures.

FIG. 3B shows the text nodes of FIG. 3A with the spell verification on.

FIGS. 4A, 4A-1 and 4A-2 illustrate the text nodes for a mixed single-byte and double-byte text with a misspelled single-byte text and the spell verification on.

FIGS. 4B, 4B-1 and 4B-2 illustrate the text nodes of FIGS. 4A-1 to 4A-2 with the misspelled word corrected.

DISCUSSION OF THE PREFERRED EMBODIMENT

Figure 1:
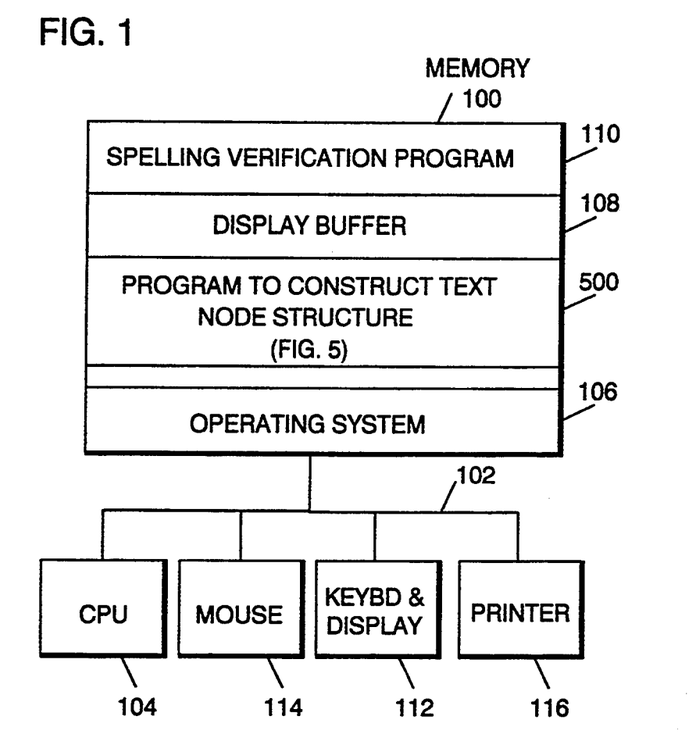
FIG. 1 is an architectural diagram of a data processing system for carrying out the invention.

The overall architectural diagram of a system for carrying out the invention is shown in FIG. 1. A memory 100 is coupled over a bus 102 to a CPU 104. The memory 100 includes programs which are a sequence of executable instructions which embody the flow diagrams shown in FIGS. 5 and 6. Also included in the memory is an operating system 106, a display buffer 108, and the spelling verification program 110. An example of spelling verification program 110 can be the spelling verification and correction program described in U.S. Pat. No. 4,498,148 to Glickman entitled "Comparing Input Words of a Word Dictionary for Correct Spelling," which is assigned to the IBM Corporation and incorporated herein by reference. Also shown in the architectural diagram of FIG. 1 is a keyboard and display 112, a mouse pointing device 114, and a printer 116.

Figure 2:
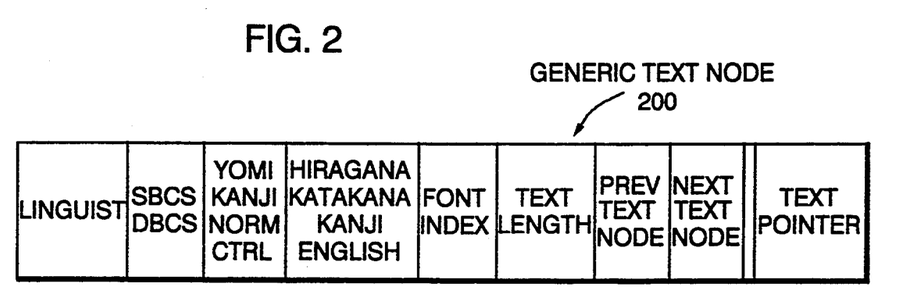
FIG. 2 is a format diagram of a generic text node, which includes the linguistic flag field, in accordance with the invention.

FIG. 2 is a basic representation of a text node 200. Not all fields are represented; only those fields relevant to the current invention.

LINGUIST—This indicates whether the text in this text node is spelled correctly or whether it has a spelling error. This flag is off for double-byte text when a Japanese spelling verification and correction program is not available. When it is available, the flag will be set accordingly. However, in an alternate embodiment of the invention, the linguist field in FIG. 2 can include additional information indicating that the text node is either spelled correctly or is misspelled for Kanji text nodes. Still further in other alternate embodiments of the invention, the linguist field can have additional information which specifies that the single-byte character set text corresponds to a national language which is either English, German, French or other single-byte character set language.

SBCS/DBCS—Indicates whether this text node contains single-byte text or double-text. Text of different sizes will not appear in the same text node.

YOMI/KANJI/NORM/CRTL—Indicates the state that the text in the current text node is in:

YOMI: Text (usually Hiragana or Katakana) which has been entered in conversion mode but which has not yet been converted to Kanji. Text will remain in this state regardless of the users' actions, unless he converts it, normalizes it, or deletes it.

KANJI: Text which has been converted to Kanji characters from Yomi but which has not yet been normalized. Text in this state will still reference all of the necessary information to perform and will remain in this state until the user unconverts it, normalizes it, or deletes it.

NORM: Text which is neither in YOMI or KANJI state. This is the standard state of English text and of Japanese text which will no longer be used in any conversion routines.

CTRL: Text which is control information containing the original Yomi which converted to a particular Kanji phrase and other control data passed back from the system conversion routines. There is one of these text nodes attached to each Kanji state phrase in the document and they are not displayed. They contain all the information necessary to do further Kana-Kanji conversion routines on the associated Kanji phrase if requested.

Text of different states will never exist in the same text node.

HIRAGANA/KATAKANA/KANJI/ENGLISH—Indicates the language and type of characters in the text node. Hiragana and Katakana are phonetic character sets used for converting to Kanji. Kanji is the full set of Japanese language ideographic characters. English is English. Text in different languages/types will never exist in the same text node.

FONT INDEX—This is an index into the font table which gives all of the font information for the text in the current text node. Text of different fonts will never exist in the same text node.

TEXT LENGTH—This is the length, in bytes, of the actual text in the current text node.

PREV TEXT NODE—This is a pointer to the previous text node in the document.

NEXT TEXT NODE—This is a pointer to the next node in the document.

TEXT POINTER—This is a pointer to a memory area which contains the actual text data in this text node.

Figure 3A:
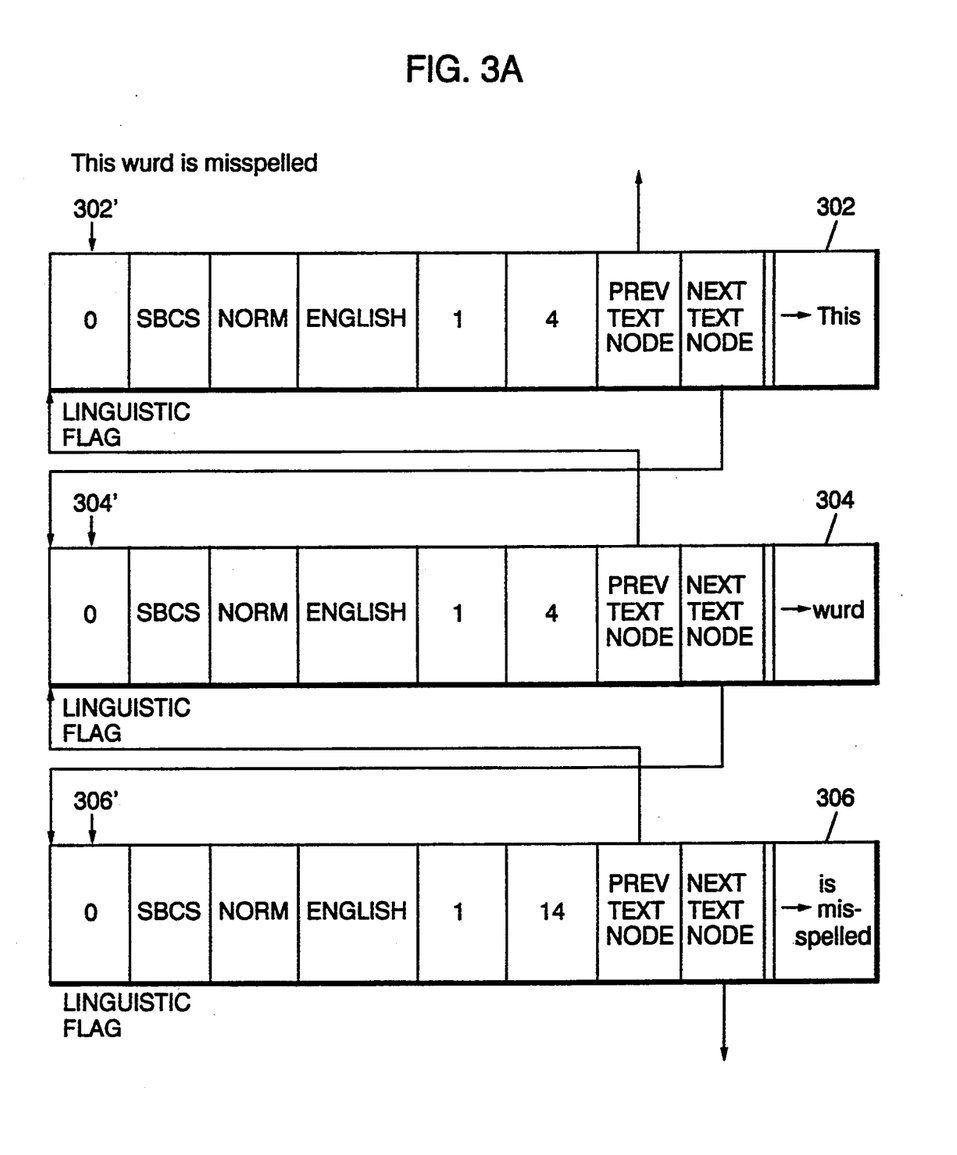
FIG. 3A shows a series of three text nodes for single-byte text with a misspelled word and the verification off.

FIG. 3A illustrates three text nodes for a single-byte English text consisting of three consecutive strings. The first text node 302 stores the string "This." The second text node 304 stores the misspelled text string "wurd." The third text node 306 stores the correctly spelled text string "is misspelled." FIG. 3A illustrates the single-byte text with the misspelled word and the spell verification off. When the spelling verification program 110 is turned off, and the user is typing in text, each consecutive text string is constructed and it is assumed that the string is correctly spelled. Therefore, the linguistic flag 302' in text node 302 is set to zero indicating a correct spelling, the linguistic flag 304' is set to zero indicating assuming a correct spelling, and the linguistic flag 306' in the text node 306 is also set to zero assuming a correct spelling.

Figure 3B:
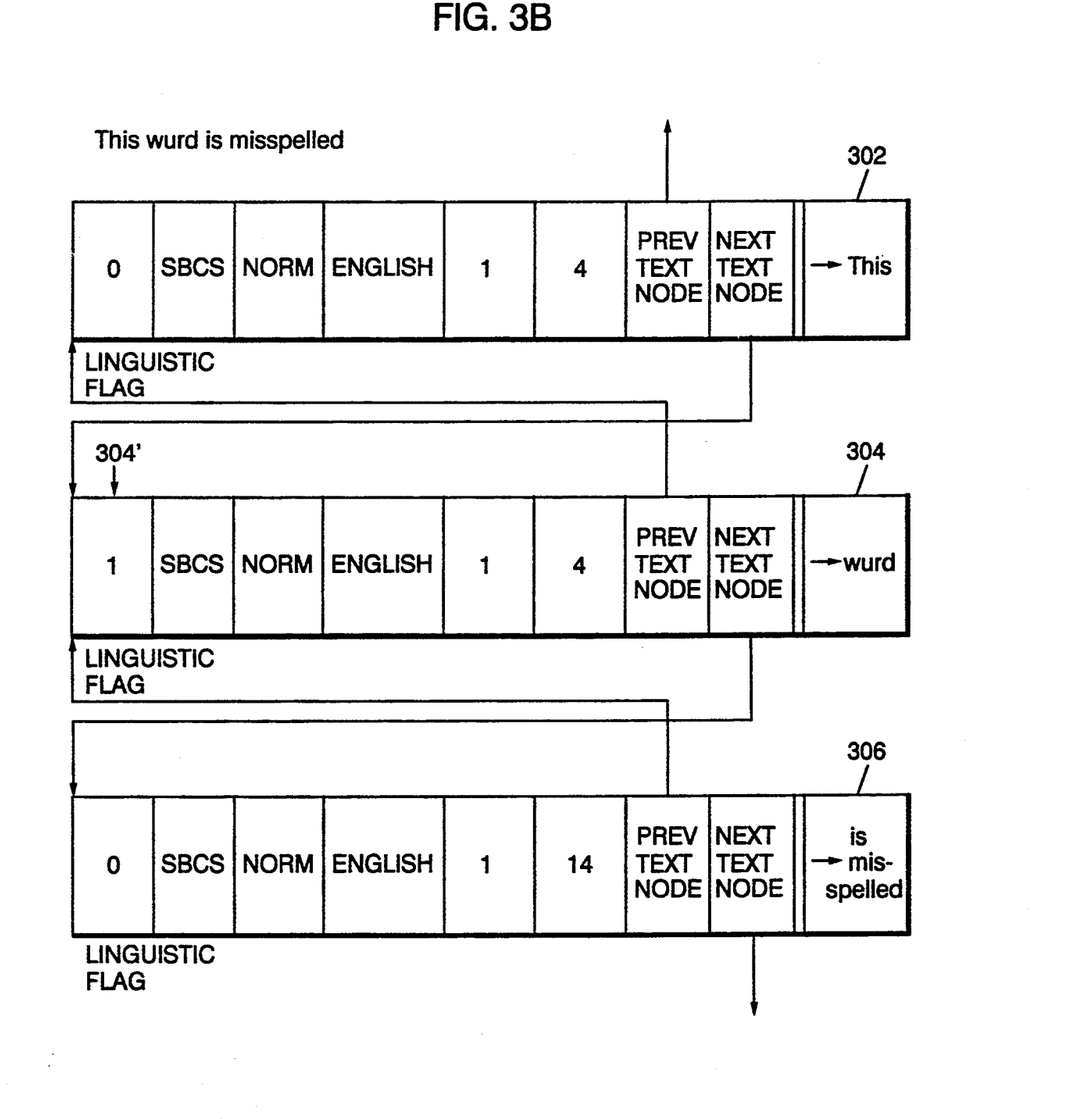

In FIG. 3B, the single-byte text with the misspelled word shown in FIG. 3A, has been subjected to the spelling verification program 110 which determines that the text node 302 is correctly spelled and that the text string and the text node is 306 is correctly spelled, but that the text string "wurd" in the text node 304 is misspelled. In accordance with the invention, the linguistic flag 304' in the text node 304 is then changed to a binary value of one, indicating that the text in that text node is misspelled. Further, in accordance with the invention, the document containing the text represented by the text nodes in FIG. 3B, will have the string "wurd" in the text node 304 displayed in highlighted fashion on the display 112, thereby alerting the user that there is a misspelled word in the text string.

Figure 3C:
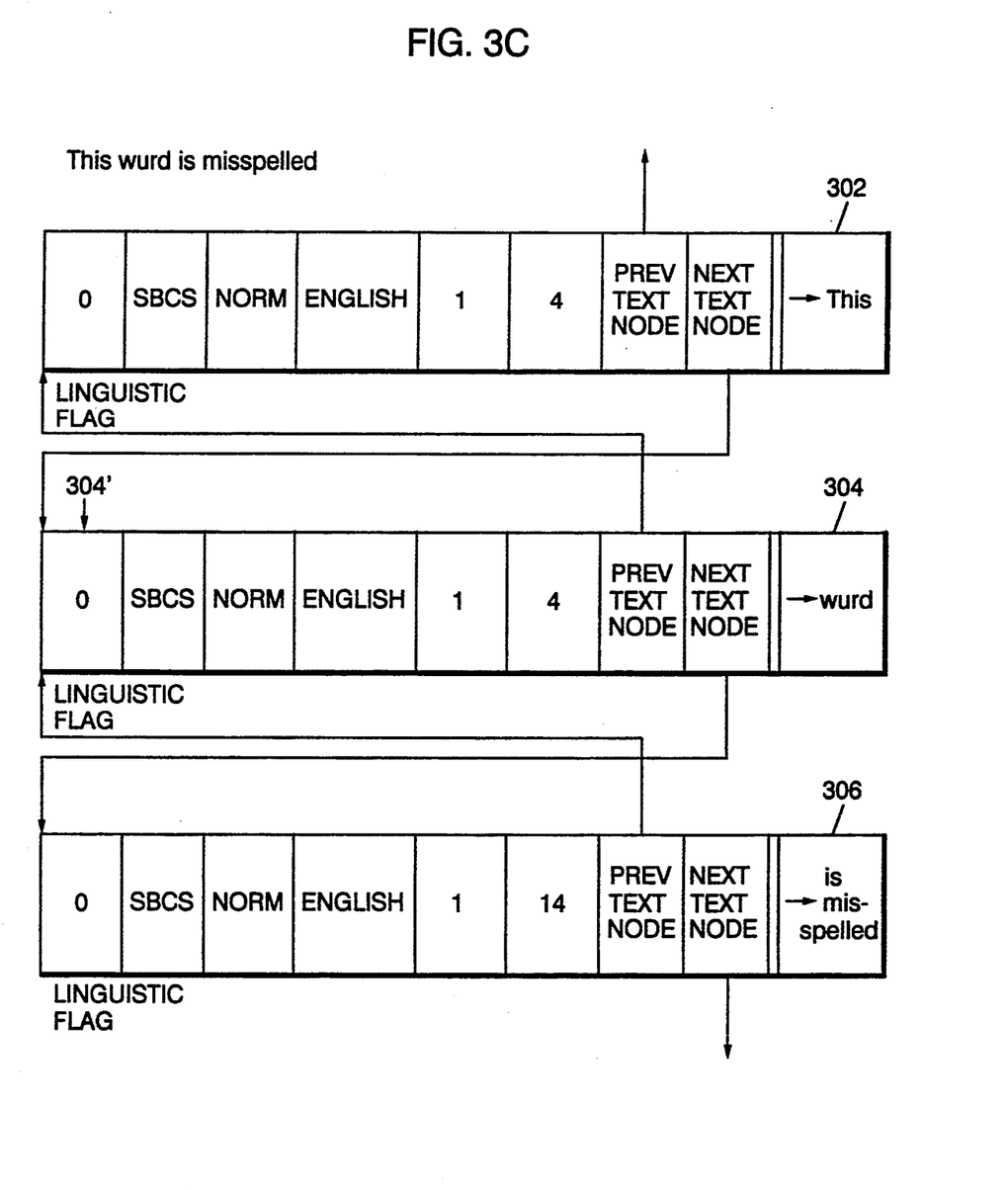
FIG. 3C shows the text nodes of FIG. 3A with the misspelled word corrected.

FIG. 3C illustrates the result of the user having corrected the misspelled word. The spelling verification program 110 can include a spelling aid feature which will present to the user candidate words which are correctly spelled versions of the misspelled word "wurd" in the text node 304. The user can then select the correct spelling and the spelling aid program 110 will then substitute the correct text string "word" selected by the user, for the misspelled word in the text node 304 of FIG. 3C. Then, in accordance with the invention, the linguistic flag 304' is reset to zero and the highlighting for the corresponding area on the display screen for the now correctly spelled string "word," is turned off.

Figures 4A, 4A:
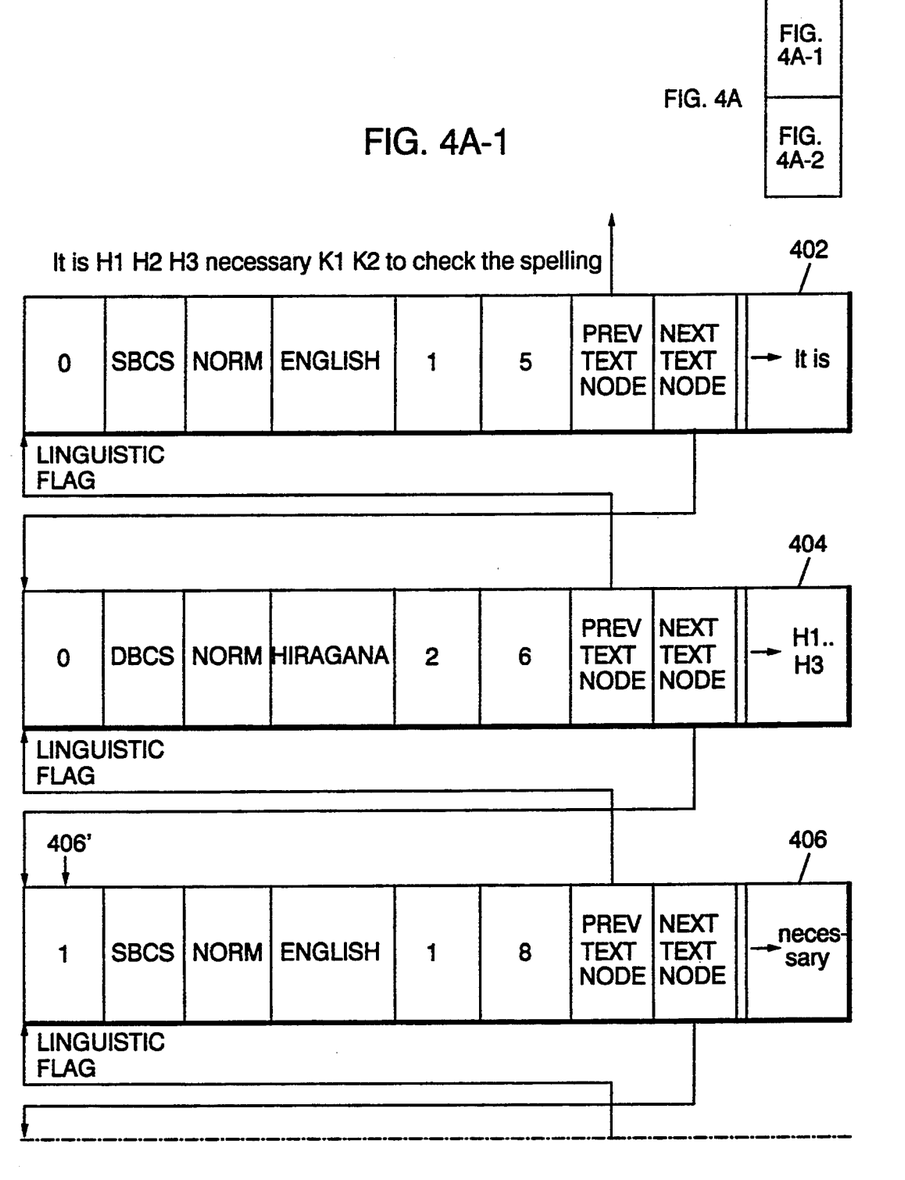
Figure 4A:
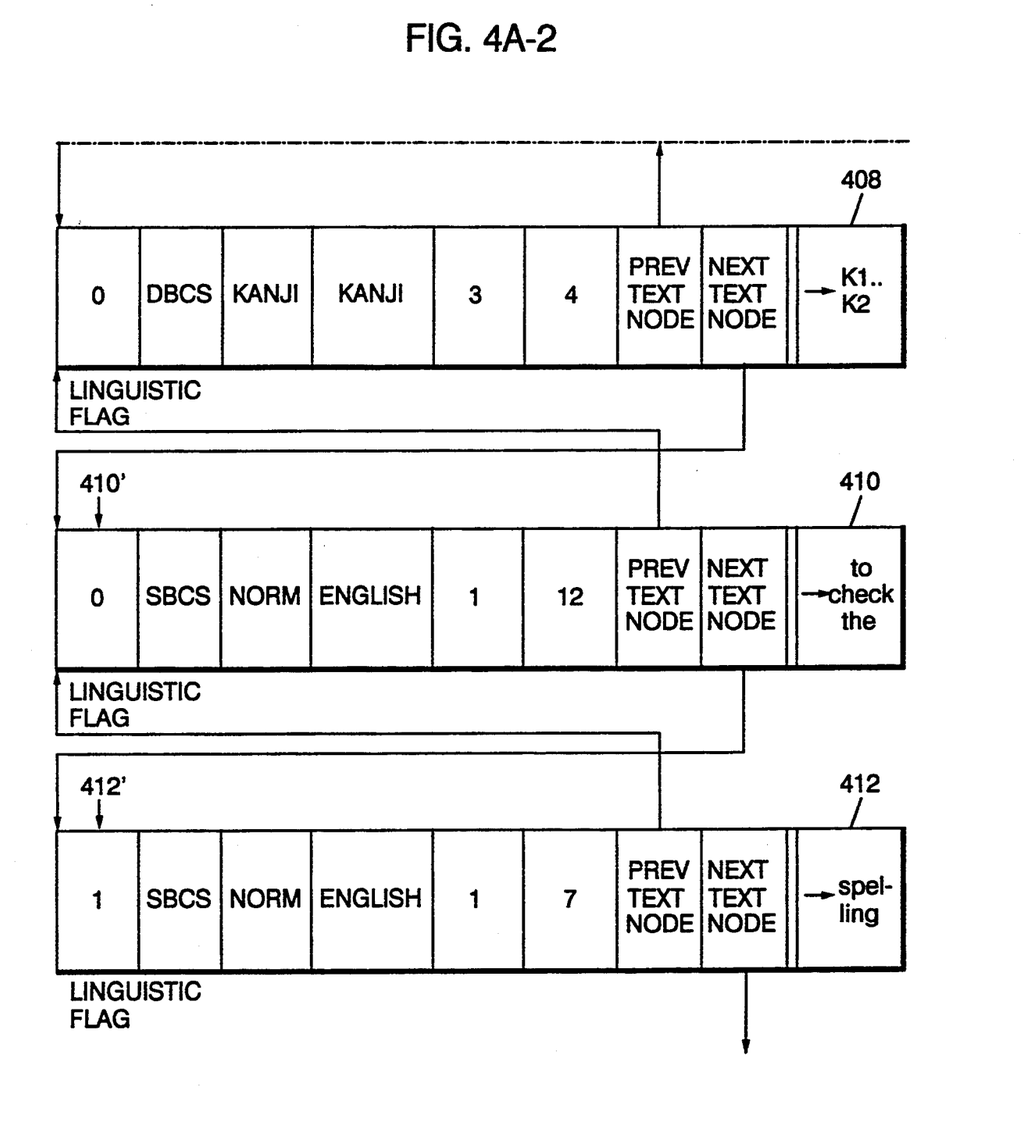
Figure 4B:
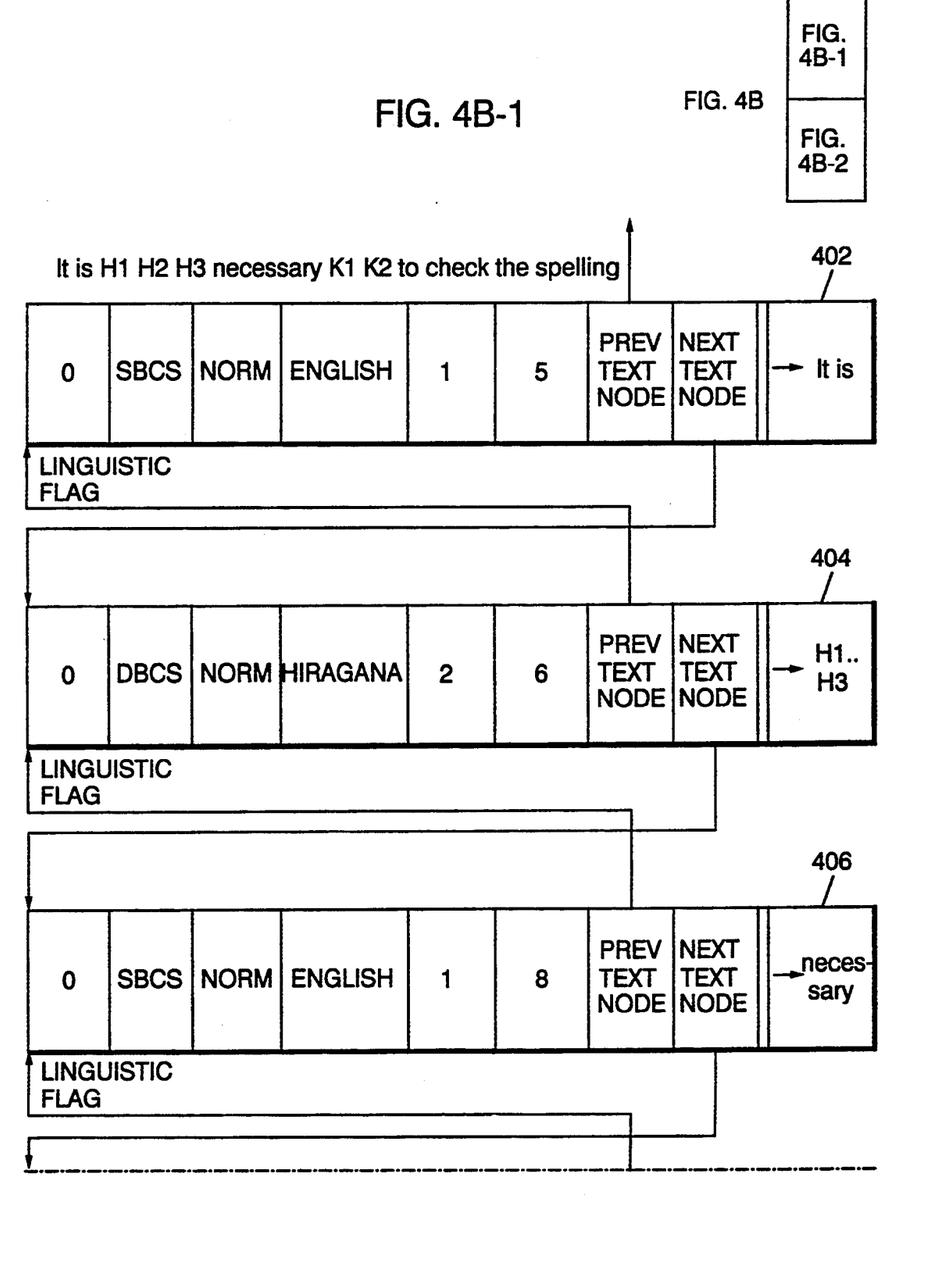
Figure 4B:
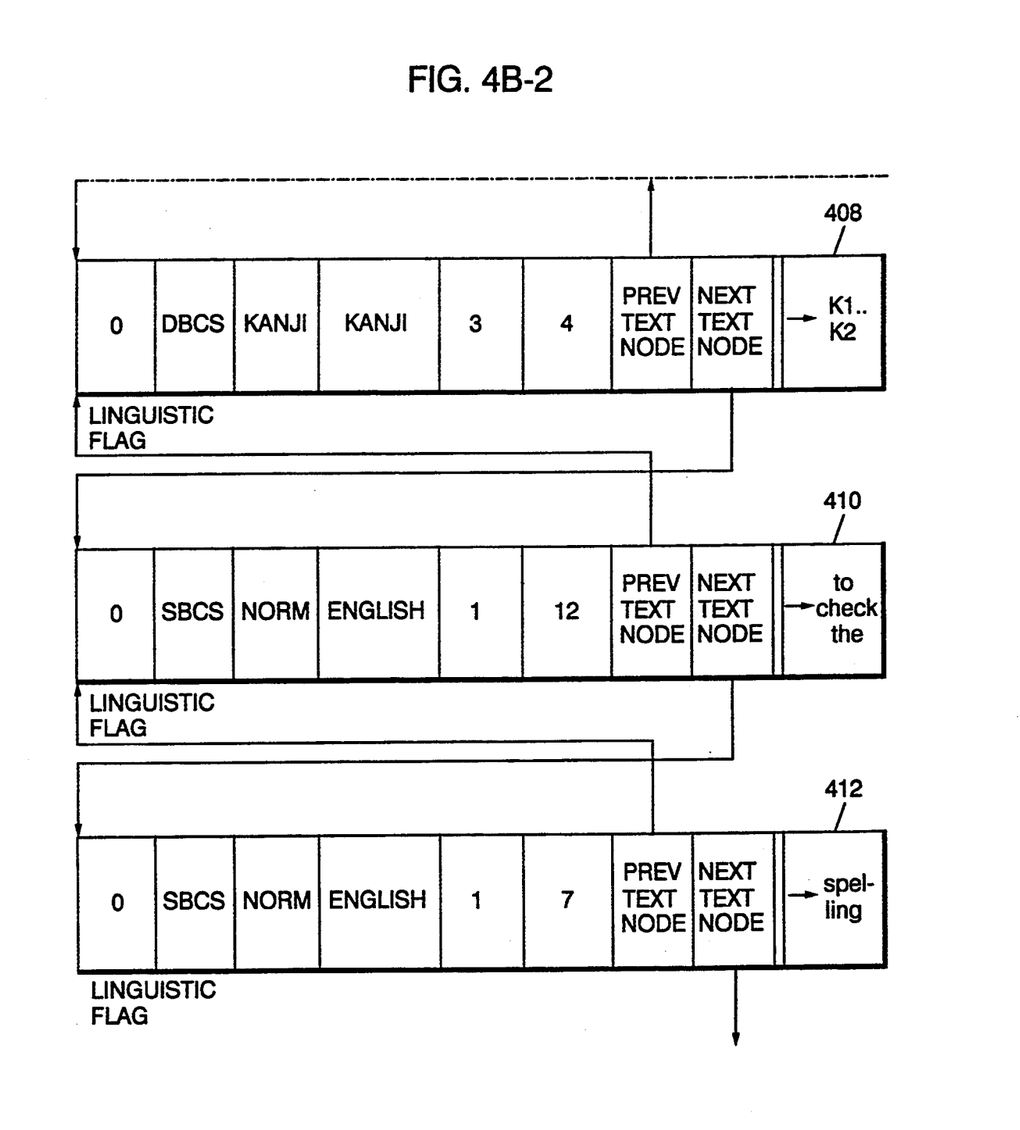
Figure 4C:
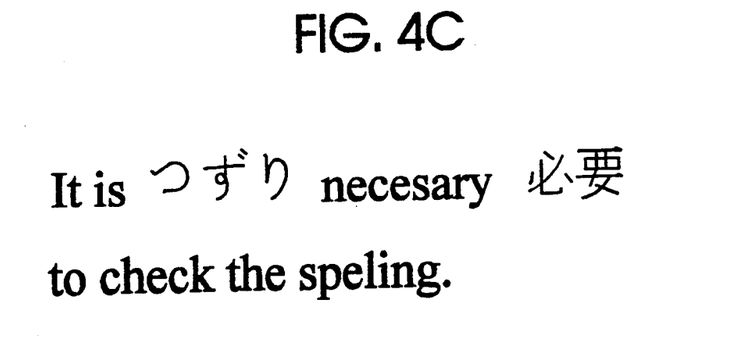
FIG. 4C illustrates the WYSIWYG (what you see is what you get) appearance of the text strings for FIGS. 4A-1 to 4A-2.

FIGS. 4A-1 and 4A-2 illustrates a mixed single-byte character set double-byte character set text with a misspelled single-byte text and spelling verification on. FIG. 4C illustrates the WYSIWYG appearance of the six mixed text strings represented in FIG. 4A-1, showing in particular the misspelled word. FIG. 4A shows the text node 402 with a single-byte character set string "It is." The linguistic flag is set to zero indicating that it is correctly spelled. The text node 404 is a Hiragana text with the Hiragana characters H1–H3 and it is indicated by the the DBCS flag being on and in this embodiment, since there is only an English text spelling aid, the linguistic flag remains zero.

The first text node 402 is a single-byte character set to English and its SBCS flag is on. The third text node 406 is an English text node with a single-byte character set and it has the misspelled string "necesary." Since the spell verification 110 has been turned, the linguistic flag 406' is set equal to one, indicating that there is a misspelled English text character string. The corresponding field on the display screen 112 will be highlighted to alert the user that there is a misspelled English string at that position.

The fourth text node 408 in FIG. 4A-2 is a Kanji string with characters K1–K2 and it is indicated that it is a double-byte character string and its linguistic flag is set equal to zero.

The fifth text node 410 in FIG. 4A-2 has an English text string "to check the," with an indication that it is an English text string and it is a single-byte character set. The corresponding linguistic flag 410' is set equal to zero since the spelling verification program 110 has determined that the words are correctly spelled.

The sixth text node 412 in FIG. 4A-2 has a misspelled English text character string "speling." The indication that it is a single-byte character set, and therefore the spelling verification program 110 has been invoked and it has been determined that there is a misspelling, and therefore the linguistic flag 412' is set equal to one. The corresponding field on the display screen 112 is highlighted in response to the linguistic flag 412' being set equal to one.

Figure 4D:
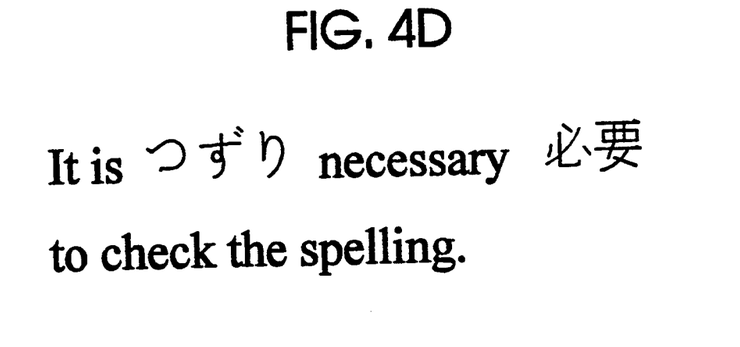
FIG. 4D illustrates the WYSIWYG appearance for the text strings in FIGS. 4B-1 to 4B-2 after the misspelled words are corrected in their spelling.

FIGS. 4B-1 and 4B-2 has the same corresponding text nodes as are shown in FIGS. 4A-1 and 4A-2, but in FIG. 4B-1 to 4B-2, the text node 406 has its string corrected for misspelling and its linguistic flag 406' is reset to zero. In addition, the text node 412 has its single-byte character set text string spelling corrected by the spell checking feature of the program 110, and its corresponding linguistic flag 412' is reset to zero, indicating that the misspelled word has now been correctly spelled. The corresponding fields for the text node 406 and 412 now have highlighting removed on the display screen 112, corresponding to the now correctly spelled versions of those words. Reference can be made to FIG. 4D which illustrates the WYSIWYG appearance of the correctly spelled text corresponding to the text nodes of FIG. 4B.

Figure 5:
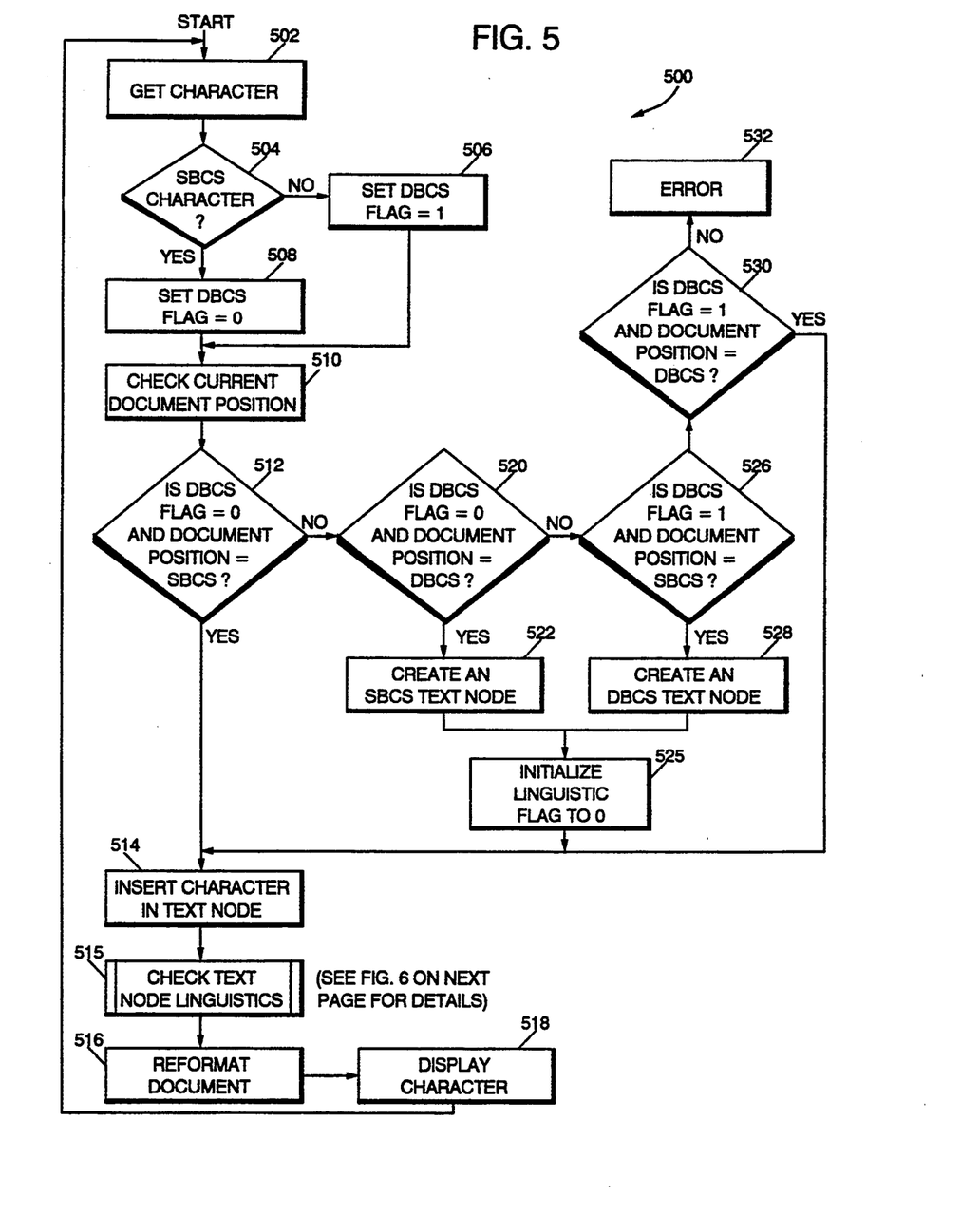
FIG. 5 is a flow diagram of a sequence of operational steps for carrying out the construction of the text nodes for a mixed single-byte character set, double-byte character set, including the provision of a linguistic flag field.
Figure 6:
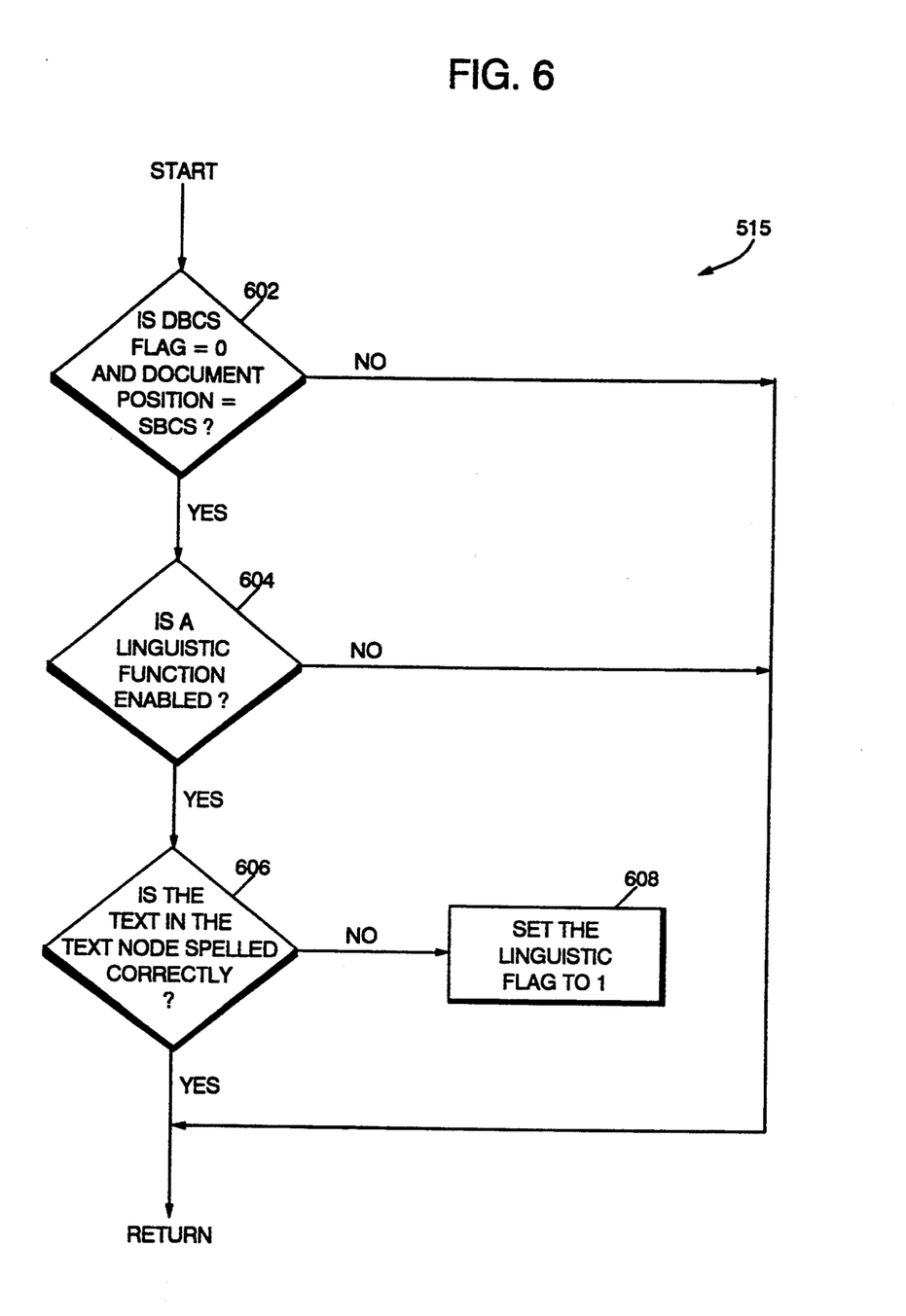
FIG. 6 illustrates the sequence of operational steps for checking and updating a text node linguistic flag, for spelling verification.

FIG. 5 is a flow diagram of the sequence of operational steps for carrying out the construction of the text nodes shown for example in FIG. 4A, which include the linguistic flag portion of the text nodes. FIG. 6 is a sequence of operational steps which set the linguistic flag in each respective text node.

FIG. 5 is a flow diagram of the sequence of operational steps for the method 500 which is a method for creating SBCS and DBCS text nodes associated with the linguistics flag. The method 500 of FIG. 5 creates the text nodes for characters as they are typed into the system shown in FIG. 1. As the operator types in characters, if the operator switches fonts or switches the character set, the method of FIG. 5 will adapt to that and generate additional sequential text nodes to define the text and to faithfully reproduce the WYSIWYG appearance of the text.

FIG. 5 starts with step 502 which gets a character, usually from the keyboard 112. Then step 504 determines whether the typed character is an SBCS character. If it is not, then step 506 sets the DBCS flag to one. Alternately, if it is an SBCS character, then step 508 sets the DBCS flag to zero. Then step 510 checks the current document position. The current document position is the current location of the cursor in the editor. As the operator sequentially types characters into the editor, the document position advances and corresponds to the cursor position shown on the display of the system. Then in step 512, it is determined whether the DBCS flag is set to 0 and the document position is in an SBCS area of the text being typed. If it is, then the method flows to step 514 which inserts the character in the text node. For example, in FIG. 5, the next character will be inserted into the text node of the SBCS text node illustrated. The text node will be checked in step 515 of FIG. 5 for the linguistics. This is done with the sequential steps shown in FIG. 6 and will be described later. Then in step 516 of FIG. 5, if it is appropriate, such as at the end of a line, the document is reformatted. This can for example be a word wrap operation where if the word extends beyond the right hot zone, then the entire word is transferred to the beginning of the left margin on the next line. Then in step 518, the character is displayed in WYSIWYG form on the monitor of the system. Then step 518 flows back to the beginning of the method 500 of FIG. 5, to get the next character in step 502.

If step 512 was not satisfied, that is if either the DBCS flag is not zero and the document position is not SBCS, then step 512 flows to step 520. In step 520, a determination is made whether the DBCS flag is set to zero and the document position is DBCS. If it is, then step 522 creates an SBCS text node.

In the flow diagram of FIG. 5, if step 520 determines that the DBCS character is not equal to the zero or that the document position is not DBCS, then step 520 flows to step 526. Step 526 determines whether the DBCS flag is set equal to one and whether the document position is SBCS. If both of these conditions are satisfied, then step 526 flows to step 528 which creates the DBCS text node. In a sense, this is a mirror image of the transition from step 520 to step 522. When step 526 transitions to step 528, it has been determined that the character which has just been typed is a DBCS character and yet the document position is currently at SBCS portion of the text. Since the new character which has just been typed is determined to be a DBCS character, step 528 creates a DBCS text node and the currently typed character is now the first character to be inserted into the text portion of the new text node. Then step 528 of FIG. 5 transfers to step 525. In step 525, initialize the linguistics flag to zero in the text node. After step 525 has been executed, the process 500 of FIG. 5 flows to step 514 and the new character is inserted into the text node which has just been created. Steps 514, 516 and 518 have been previously described.

If step 526 in FIG. 5 is not satisfied, that is if either the DBCS flag is not equal to one or the document position is not SBCS, then step 526 flows to step 530. Step 530 determines whether the DBCS flag is set equal to one and whether the document position is DBCS. If that condition is satisfied, then step 530 flows to step 514 and the DBCS character is inserted into the DBCS text node currently being filled. If step 530 is not satisfied, then all of the possible values for the DBCS flag and the document position have been tested and an error has been made so the process 500 flows to step 532 to process an error condition.

In step 515 of FIG. 5, it checks the text node linguistics. This is done with the sequence of operational steps shown in FIG. 6. FIG. 6 makes use of the spelling verification and spelling aid program 110, such as is described in U.S. Pat. No. 4,498,148 by Glickman. In the preferred embodiment, only single-byte character set English text is spell checked. Double-byte character set Japanese text is not spell checked. In the preferred embodiment, in FIG. 6, step 515 is expanded into the four steps 602, 604, 606 and 608. In step 602, determination is made whether the double-byte character set flag set equal to zero, meaning that there is a single-byte character set character present. If there is a single-byte character set character present, then the method flows to step 604. In step 604, a determination is made as to whether the linguistic function is turned on, that means whether the spell verification and checking program 110 is enabled. If it is enabled, then the method flows to step 606. In step 606, a determination is made by the spell checking and spelling aid program 110, whether the text contained in the text node is correctly spelled. If it is not correctly spelled, then the linguistic flag in the text node is set equal to binary one. However, if it is correctly spelled, then the current zero value in the linguistic flag field remains unchanged and is equal to binary zero. Then the flow diagram of FIG. 6 progresses to step 516 of FIG. 5.

In a first alternate embodiment of the invention if a Japanese spelling verification and correction program is provided, then a corresponding determination can be made in step 602 as to whether the double-byte character set flag is turned on and if it is, then the corresponding determination can be made in step 604 as to whether the Japanese spelling verification program is enabled. If it is, then the corresponding step 606 can perform a spelling verification operation with the Japanese language spelling verification program, to determine if the corresponding double-byte character set Japanese phrase is correctly spelled. If it is correctly spelled, then the program returns to step 516 in FIG. 5. If it is not correctly spelled, then the corresponding step 608 can set the linguistic flag equal to one.

In still another alternate embodiment of the invention both an English text spelling verification program and a Japanese text spelling verification program can be present. In this second alternate embodiment of the invention, the corresponding step 602 will determine if a single-byte character set character is present. If it a single-byte character set character is present, then a branch will go to a corresponding step 604 which will determine if the single-byte character set English text spelling correction program is enabled and if it is, then the corresponding step 606 will perform a spelling verification and if there is a misspelling, a linguistic flag for the English text will be set equal to one indicating a misspelling. If the double-byte character set flag is set equal to one indicating that the string in the text node is a Japanese text, then a branch is made to a Japanese spelling verification program and a determination is made in the corresponding step 604 as to whether that Japanese spelling verification program is enabled. If it is, then the corresponding step 606 will perform a spelling verification on the Japanese double-byte character set string to determine if it is correctly spelled and if it is not, then the corresponding step 608 will set a Japanese linguistic flag equal to one in the text node to indicate a misspelling of a double-byte character set Japanese phrase.

An example of a Japanese language double-byte character set spelling verification and spelling aid program can be found in the publication "Shinbun Gijutsu (Newspaper Technology)," February 1990, Development Status and Prospective of IBM Japan, page 8–10, T. Kaneko, et al. That publication describes a proofreading support function which searches out a string of characters which are exclusively double-byte Japanese characters and makes a syntactic analysis of the string of characters and performs a flexible rule-based critiquing system called "FLECS."

Although a specific embodiment of the invention has been disclosed, it will be understood by those having skill in the art that changes can be made to that specific embodiment without departing from the spirit and the scope of the invention.

What is claimed is:

1. In a data processing system, having a computer processor, a memory and text input and output means a computer implemented method for providing linguistic functions of text in a structured document which presents single-byte character set +(SBCS+) and double-byte character set +(DBCS+) text in the same document, comprising the steps of:

inputting in said memory of said computer of said data processing system a first alphanumeric character;

determining in said computer processor of said system whether said input character is SBCS or DBCS;

determining in said memory of said system a current document position;

inserting in said memory of said system the input character into a DBCS text node if the input character is determined to be DBCS;

inserting in said memory of said system a character into an SBCS text node if the input character is determined to be SBCS;

creating in said memory of said system an SBCS text node and inserting the character therein if the input character is determined to be an SBCS character and a document position is determined to be DBCS;

setting in said memory of said system a linguistic flag to an initial value which assumes that the SBCS text string is correctly spelled;

performing in said computer processor of said system a spell verification operation on said SBCS text string;

changing in said memory of said system said linguistic flag to represent a misspelling of said SBCS text strings as determined by said step of performing said spell verification;

displaying in said output means of system said misspelled SBCS text string in a highlighted mode to emphasize a location of a misspelled SBCS text string.

2. The method of claim 1 which further comprises the steps of:

invoking a spelling correction program execution in said computer processor of said system in response to the presence of said highlighted display for said misspelled SBCS text string;

correcting the spelling of misspelled SBCS text string;

changing said linguistic flag in said SBCS text node in said memory of said system to represent a correctly spelled SBCS text string therein;

removing said highlighted emphasis from said displayed text string.

3. In a data processing system having a computer processor, a memory and a text input and output means, a computer implemented method for providing linguistic functions of text in a structured document which presents single-byte character set {SBCS} and double-byte character set {DBCS} text in the same document, comprising the steps of:

inputting in said memory of said system a first alphanumeric character;

determining in said computer processor of said system whether said input character is SBCS or DBCS;

determining in said memory of said system a current document position;

inserting in said memory of said system the input character into a DBCS text node if the input character is determined to be DBCS;

inserting in said memory of said system a character into an SBCS text node if the input character is determined to be SBCS;

creating in said memory of said system a DBCS text node and inserting the character therein if the input character is determined to be a DBCS character and a document position is determined to be SBCS;

setting in said memory of said system a linguistic flag to an initial value which assumes that the DBCS text string is correctly spelled;

performing in said computer processor of said system a spell verification operation on said DBCS text string;

changing in said memory of said system said linguistic flag to represent a misspelling of said DBCS text strings as determined by said step of performing said spell verification;

displaying in said output means of said system said misspelled DBCS text string in a highlighted mode to emphasize a location of a misspelled DBCS text string, 4. The method of claim 3 which further comprises the steps of:

invoking a spelling correction program execution in said computer processor of said system in response to the presence of said highlighted display for said misspelled DBCS text string;

correcting the spelling of misspelled DBCS text string;

changing said linguistic flag in said DBCS text node in said memory of said system to represent a correctly spelled DBCS text string therein;

removing said highlighted emphasis from said displayed text string.

5. In a data processing system having a computer processor, a memory and text input and output means, a computer implemented method for providing linguistic functions of mixed Western and Oriental text in a structured document which presents single-byte character set {SBCS} and double-byte character set {DBCS} text in the same document, comprising the steps of:

inputting in said memory of said system a first alphanumeric character;

determining in said computer processor of said system whether said input character is SBCS or DBCS;

determining in said memory of said system a current document position;

inserting in said memory of said system the input character into a DBCS text node if the input character is determined to be DBCS;

inserting in said memory of said system a character into an SBCS text node if the input character is determined to be SBCS;

creating in said memory of said system an SBCS text node and inserting the character therein if the input character is determined to be an SBCS character and a document position is determined to be DBCS;

setting in said memory of said system a linguistic flag to an initial value which assumes that the SBCS text string is correctly spelled;

performing in said computer processor of said system a spell verification operation on said SBCS text string;

changing in said memory of said system said linguistic flag to represent a misspelling of said SBCS text strings as determined by said step of performing said spell verification;

displaying in said output means of said system said misspelled SBCS text string in a highlighted mode to emphasize a location of a misspelled SBCS text string;

creating in said memory of said system a DBCS text node and inserting the character therein if the input character is determined to be a DBCS character and said document position is determined to be SBCS;

setting in said memory of said system a linguistic flag to an initial value which assumes that the DBCS text string is correctly spelled;

performing in said memory of said system a spell verification operation on said DBCS text string;

changing in said memory of said system said linguistic flag to represent a misspelling of said DBCS text strings;

displaying in said output means of said system said misspelled DBCS text string in a highlighted mode to emphasize the location of a misspelled DBCS text string.

6. The method of claim 5 which further comprises the steps of:

invoking a spelling correction program execution in said computer processor of said system in response to the presence of said highlighted display for said misspelled text string;

correcting the spelling of misspelled text string;

changing in said memory of said system said linguistic flag in a text node of said misspelled text string to represent a correctly spelled text string therein;

removing said highlighted emphasis from said displayed text string.

7. The method of claim 5, wherein for a text which contains mixed national languages which both use SBCS, changing the linguistic flag field in said memory of said system to include additional information identifying the national language for a particular text string;

and if said linguistic flag field indicates that there is a misspelling for either the first or alternately the second language, then displaying the corresponding text string by a highlighted condition said output means of said system.

8. The method of claim 5, wherein for a text which contains mixed national languages which both use DBCS, changing the linguistic flag field in said memory of said system to include additional information identifying the national language for a particular text string;

and if said linguistic flag field indicates that there is a misspelling for either the first or alternately the second language, then displaying the corresponding text string in a highlighted condition in said output means of said system.

* * * * *